(12) United States Patent
Shoji et al.

(10) Patent No.: US 7,251,461 B2
(45) Date of Patent: Jul. 31, 2007

(54) WIRELESS COMMUNICATIONS SYSTEM, WIRELESS TRANSMITTER, AND WIRELESS RECEIVER

(75) Inventors: Yozo Shoji, Tokyo (JP); Kiyoshi Hamaguchi, Tokyo (JP); Hiroyo Ogawa, Tokyo (JP)

(73) Assignee: National Institute of Information and Communication Technology, Tokyo (JP)

( * ) Notice: Subject to any disclaimer, the term of this patent is extended or adjusted under 35 U.S.C. 154(b) by 374 days.

(21) Appl. No.: 10/271,785

(22) Filed: Oct. 17, 2002

(65) Prior Publication Data

US 2003/0109236 A1     Jun. 12, 2003

(30) Foreign Application Priority Data

Dec. 11, 2001     (JP)     ............................. 2001-376816

(51) Int. Cl.
*H04B 1/00*     (2006.01)
(52) U.S. Cl. ...................... 455/101; 455/103; 455/132; 455/209; 375/299; 375/347
(58) Field of Classification Search ................ 455/101, 455/59, 103, 44, 105, 129, 139, 132, 208, 455/209; 375/347, 299
See application file for complete search history.

(56) References Cited

U.S. PATENT DOCUMENTS 4,490,830 A * 12/1984 Kai et al. .................... 375/299
4,761,821 A * 8/1988 Mawhinney et al. ........... 455/73
5,369,800 A * 11/1994 Takagi et al. ................. 455/59
5,513,222 A * 4/1996 Iwasaki ....................... 375/347
5,912,927 A * 6/1999 Smith et al. ................. 375/299
6,542,722 B1 * 4/2003 Sorrells et al. ............. 455/110
6,714,800 B2 * 3/2004 Johnson et al. ............. 455/561

FOREIGN PATENT DOCUMENTS

JP     2001-053640 A     2/2001
JP     2001-177452           6/2001

* cited by examiner

*Primary Examiner*—Edward F. Urban
*Assistant Examiner*—Adeel Haroon
(74) *Attorney, Agent, or Firm*—Birch, Stewart, Kolasch, & Birch, LLP

(57) ABSTRACT

This invention includes a wireless transmitter comprising an IF-signal generator that modulates input signals into those of an intermediate frequency band, signal distributors that distribute signals from the IF-signal generator, and a plurality of signal-transmission units that convert the signals distributed by the signal distributors into those of a radio frequency band, and then transmit the converted radio signals. The invention also includes a wireless receiver that receives the radio-frequency-band modulated signals and restores the signals of the intermediate frequency band. In this way, effective diversity is realized and signal interruptions are prevented. In addition, a handy, low-cost wireless communications system is provided.

4 Claims, 9 Drawing Sheets

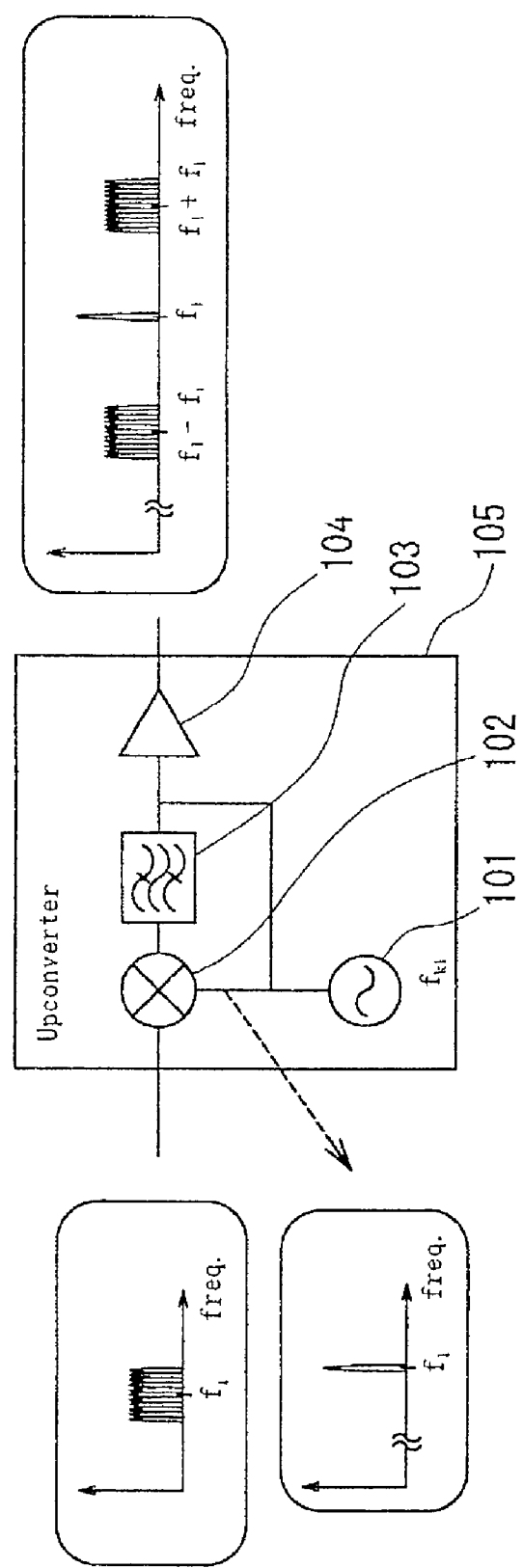

WIRELESS COMMUNICATIONS SYSTEM, WIRELESS TRANSMITTER, AND WIRELESS RECEIVER

This nonprovisional application claims priority under 35 U.S.C. § 119(a) on Patent Application No. 2001-376816 filed in Japan on Dec. 11, 2001, which is herein incorporated by reference.

BACKGROUND OF THE INVENTION

1. Field of the Invention

The invention relates to a communications system used for wireless communications and, more specifically, to a technique for realizing high-performance wireless communications using a plurality of receivers or transmitters.

2. Description of the Related Art

With the recent increase in demand for wireless communications represented by computer communications, there is a growing need for technology that can transmit broadband digital signals and analog signals while maintaining high signal quality. As a result, some frequency bands, particularly those higher than the SHF band, have come into use due to their wide bandwidth and the shortage of available frequencies in the microwave band. These bands are now being used in, for example, millimeter-wave-based video image multiplex transmission systems, wireless LAN, wireless home-link, and wireless road-vehicle (or vehicle-vehicle) communications systems.

In many wireless communications systems using high radio frequencies, the transmitter generates modulated signals in an intermediate frequency band, multiplexes two or more channels, and then converts (upconverts) the modulated signals into those of a predetermined radio frequency band using a local oscillation source. The receiver, in turn, converts (downconverts) the received signals of a radio frequency band into those of the intermediate frequency band using a local oscillation source, and then extracts the channels and demodulates the modulated signals.

During this process of signal exchange, the local oscillation sources used in the transmitter and the receiver must be synchronized with each other. If there are time-varying fluctuations in frequency and signal phase between the employed oscillation sources, the fluctuations overlap the modulated signals that have been downconverted, and degrade the quality of demodulated signals.

Thus, both the transmitter and receiver require a local oscillation source with high frequency-stability. It is, however, technically difficult to realize a local oscillator that provides high frequency-stability even at high frequencies. Even if such an oscillator becomes available, its manufacturing cost will be very high, and the wireless communications system employing such an oscillator will be expensive as a result.

Furthermore, because a wireless communications system using a high-frequency band such as the millimeter-wave band must receive direct signals, the path of radio waves is often blocked by obstacles such as humans, making it difficult to carry out stable wireless communication.

To solve such problems, the applicant of this invention has disclosed a self-heterodyne-type wireless communications system in Japanese Patent Kokai publication No. 2001-53640. In this disclosure, the signals for transmission are converted by a local oscillation signal from those of an intermediate frequency band into those of a radio frequency band, and the local oscillation signal and modulated radio-frequency-band signals are transmitted together wirelessly. Upon signal reception, the oscillation signal and modulated signals are mixed to restore the signals of the intermediate frequency band.

Such a self-heterodyne-type system having a receiver with a simple structure can transmit signals of high quality and reduce the cost of wireless communications systems.

To solve the signal-blocking problem, it is effective to adopt a diversity technique employing a plurality of independent transmitters or receivers. However, the prior-art structure involves some problems when it is used in the millimeter-wave band and its vicinity.

Specifically, according to a prior-art technique known as switching diversity, in which signals are transmitted or received by switching transmitters or receivers, switching noise is generated by the switching operation during the transmission or the reception of signals such as video images. Furthermore, if there is a large frequency offset upon switching, it is difficult for the demodulator circuit to quickly respond to such an offset, and thus it is also difficult to maintain stable wireless communication.

In addition, according to a technique known as "combining diversity," in which a plurality of independent signals for transmission/reception are combined in-phase, it is difficult to prevent the occurrence of frequency differences between the independent oscillators, and it is also difficult to synchronize signal phases during signal combining due to independent phase fluctuations (phase noise).

SUMMARY OF THE INVENTION

One aspect of the invention is to provide a handy, low-cost wireless communications system that can realize effective diversity and prevent signal blocking, even in cases in which high-frequency bands such as the millimeter-wave band are used. To solve the conventional problems, the present wireless communications system has the following features.

The present invention adopts a self-heterodyne mechanism that converts signals for the transmission of an intermediate frequency band to those of a radio frequency band using a local oscillation signal, and wirelessly transmits the local oscillation signal and the converted radio-frequency-band signals simultaneously, while restoring the intermediate-frequency band signals upon signal reception by producing the multiplicative element of the local oscillation signal and the received radio-frequency-band signals.

This wireless communications system has a wireless transmitter equipped with a plurality of antennas and transmission mechanisms, and a wireless receiver equipped with at least one antenna and one reception mechanism, to achieve diversity in signal transmission.

The above wireless transmitter comprises at least an intermediate-frequency-band modulator that modulates the signals for transmission into those of an intermediate frequency band, signal distributors that distribute the signals from said intermediate-frequency-band modulator, and a plurality of signal-transmission units that convert the signals distributed by the signal distributors into those of a radio frequency band and then transmit the converted radio-frequency-band signals.

Meanwhile, it is not necessary for the wireless receiver to have a local oscillator that generates local oscillation signals. The receiver receives radio-frequency-band modulated signals and a local oscillation signal and restores the signals of the intermediate frequency band by mixing them.

This invention may comprise a wireless transmitter equipped with at least one antenna and one transmission mechanism, and a wireless receiver equipped with a plurality of antennas and reception mechanisms for realizing diversity in signal reception.

The wireless transmitter converts the signals for transmission into those of an intermediate frequency band and then wirelessly transmits said converted signals, while the wireless receiver comprises at least a plurality of signal-reception units that receive the converted radio-frequency-band signals using the respective reception antennas, signal adjustors that are each installed in the individual signal-reception units and provide either phase offset or power control to the received signals, signal synthesizers that synthesize the signals from the signal adjustors, and an intermediate-frequency-band demodulator that demodulates said synthesized intermediate-frequency-band modulated signals.

This invention can also provide a wireless transmitter or a wireless receiver that can be used in wireless communications systems.

Such a wireless transmitter comprises an intermediate-frequency-band modulator that modulates the signals for transmission into those of an intermediate frequency band, signal distributors that distribute the signals from the intermediate-frequency-band modulator, and a plurality of signal-transmission units that transmit the signals distributed by the signal distributors in a radio frequency band.

In particular, each signal-transmission unit has a local oscillating means, a multiplexing means for producing the multiplicative element of the local oscillation signal of said local oscillating means and the signals for transmission, a bandpass filtering means, an amplifying means, and a transmission antenna; and a plurality of such transmission units are installed in the transmitter.

Such a wireless receiver comprises a plurality of signal-reception units that receive radio signals of a radio frequency band, signal adjustors that are each installed in the individual signal-reception units and provide either phase offset or power control for the received signals, signal synthesizers that synthesize the signals from the signal adjustors, and an intermediate-frequency-band demodulator that demodulates said synthesized intermediate-frequency-band modulated signals.

In the wireless system according to this invention, there is no frequency offset or phase noise resulting from a plurality of independent oscillators to the restored signals for demodulation in receivers, because the synthetic diversity can be performed in a completely coherent manner among several receivers. Thus, even when the receiver has moved, the handoff can be carried out seamlessly.

In addition, because the wireless receiver has a plurality of reception units, even when a few signals are blocked, there is no instantaneous interruption in signal reception, and thus seamless diversity can be realized.

BRIEF DESCRIPTION OF THE DRAWINGS

FIGS. 3a through 3e are examples of the upconverter of the transmitter.

Throughout the figures, 30 is a wireless communications system, 31 a wireless transmitter, 32 a wireless receiver, 33 an input signal, 34 an IF-signal generator, 35 a millimeter-wave transmission unit, 36 a mixer, 37 a local oscillator, 38 a bandpass filter, 39 an amplifier, 40 a transmission antenna, 41 a millimeter-wave reception unit, 42 a millimeter-wave reception unit, 43 a millimeter-wave reception unit, 44 an adder, 45 an IF-signal demodulator, 46 an output signal, 47 a reception antenna, 48 an amplifier, 49 a bandpass filter, 50 a mixer/square-law-detector, and 51 a signal adjustor.

DESCRIPTION OF THE PREFERRD EMBODIMENT

The preferred embodiments of the invention will be described with reference to the accompanying drawings.

Figure 1:
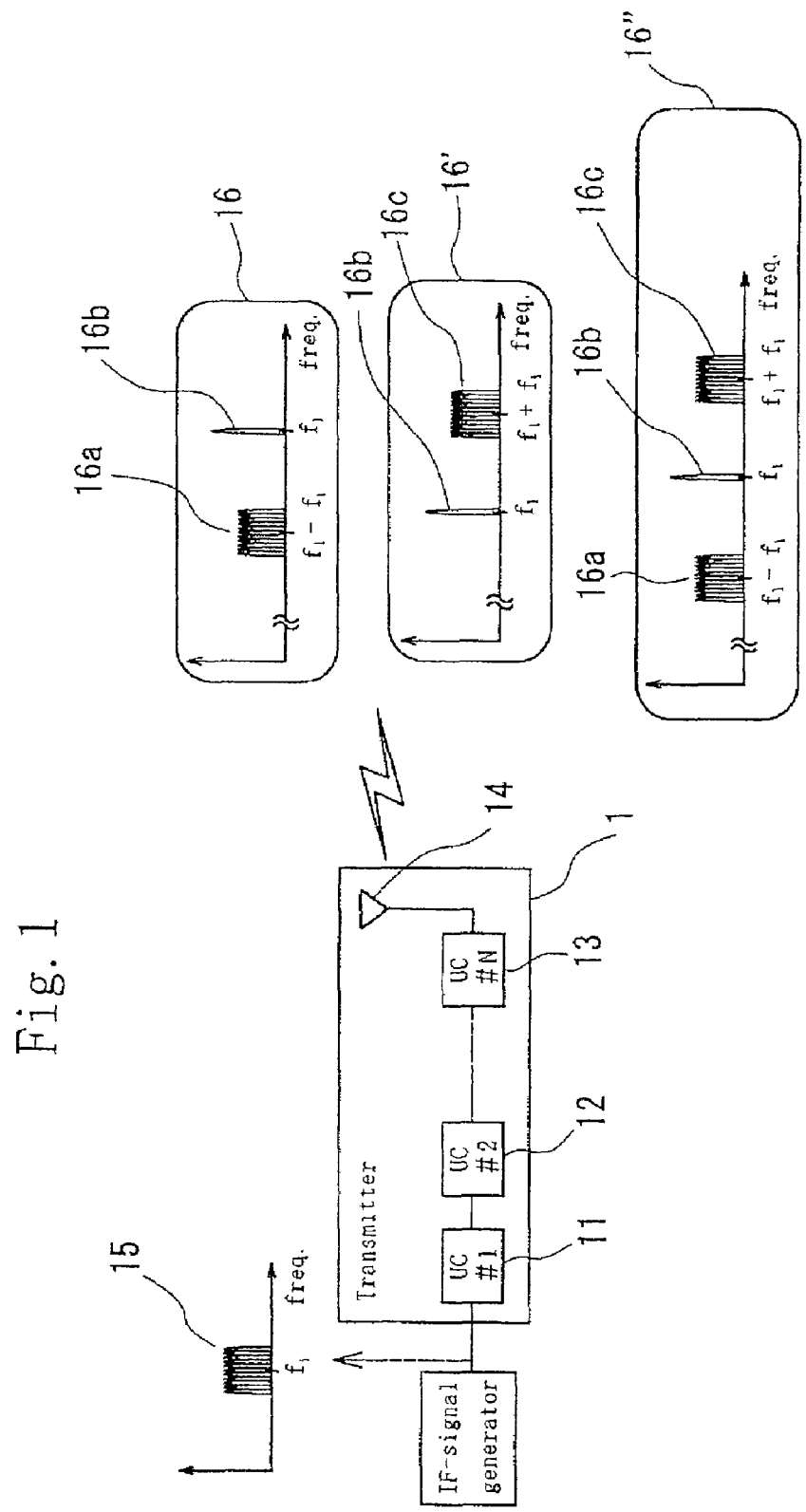
FIG. 1 is a diagram illustrating the structure of a self-heterodyne-type transmitter according to the present invention.
Figure 2:
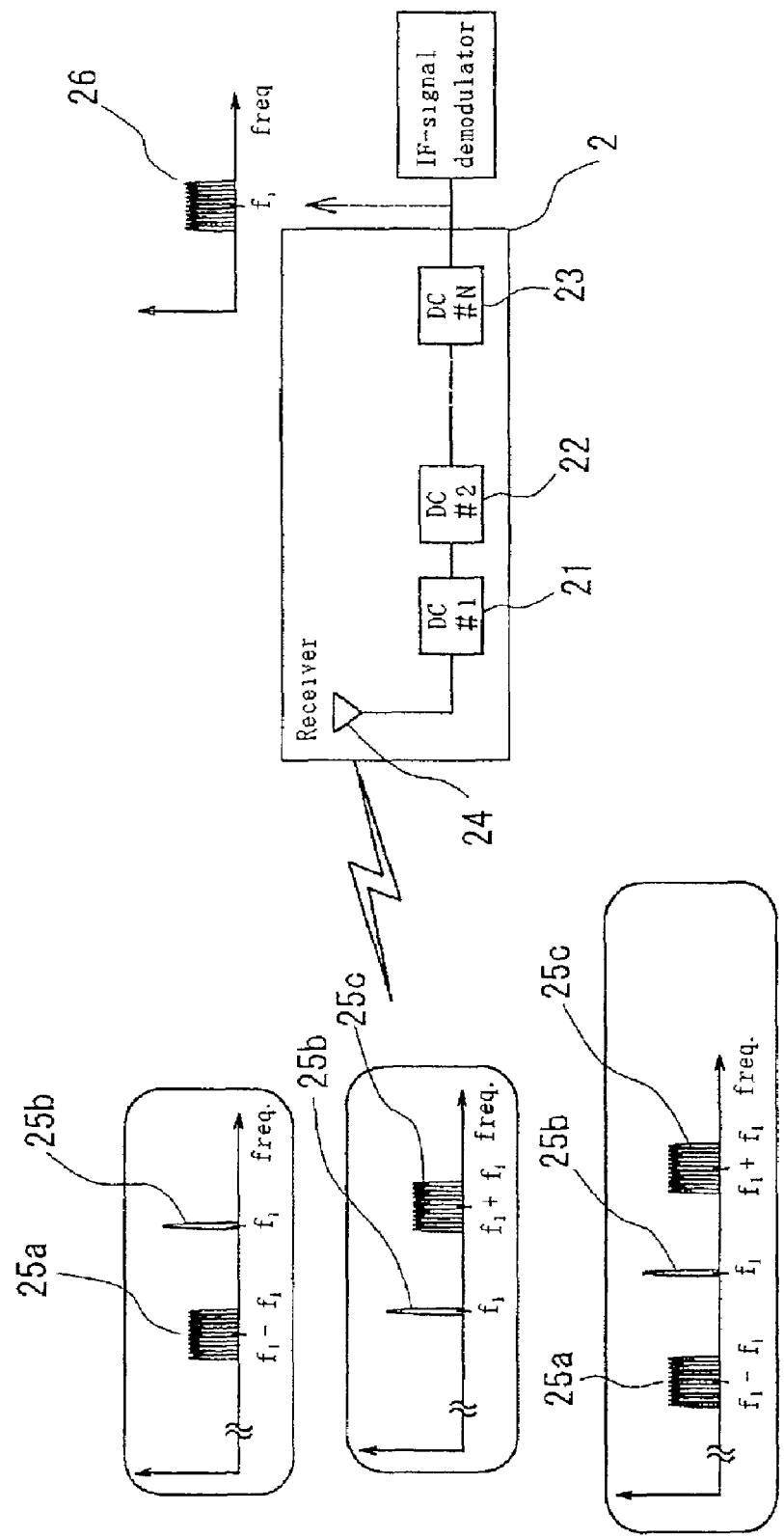
FIG. 2 is a diagram illustrating the structure of a self-heterodyne-type receiver according to the present invention.

FIGS. 1 and 2 are diagrams illustrating the structures of the transmitter and the receiver, respectively, used in the self-heterodyne-type wireless communications system of the invention.

In principle, the self-heterodyne-type transmitter (1) has the function of transmitting signals (one of the signal sets (16), (16') and (16")) in which the RF-band signals (16a), (16c) that have been converted from the input IF-band signal (15) are multiplexed with the non-modulated carrier (16b) that will be necessary for downconverting in the receiver.

The major constituting elements of the transmitter are an antenna (14) and frequency-converter circuits (upconverters) (11) (12) . . . (13), and these upconverters have one of the structures shown in FIGS. 3a–3e.

Figure 3A:
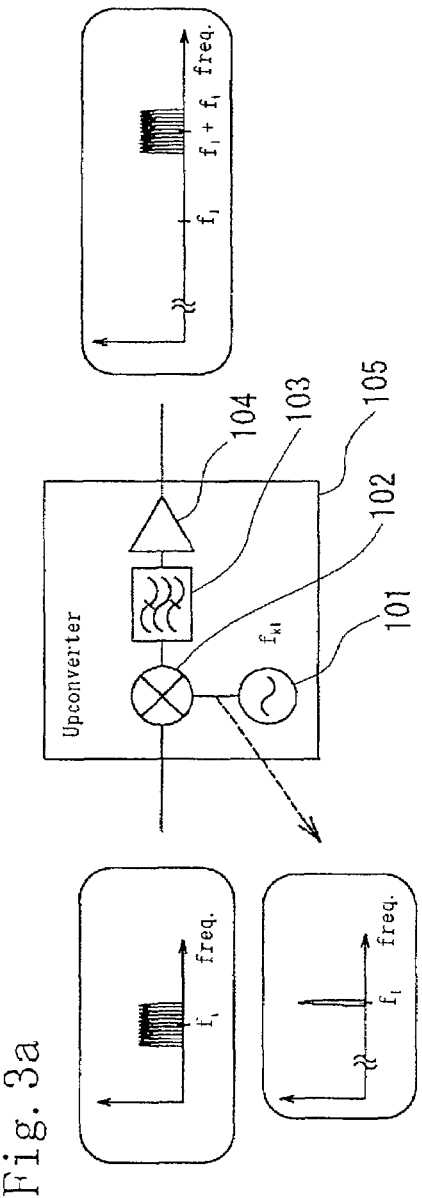

In the converter of the structure shown in FIG. 3a, the input signal and the signal from a local oscillator (101) enter a mixer (102). A bandpass filter (103) removes the local oscillation signal element and image element, and an amplifier (104) amplifies the signals for output. Otherwise, the mixer (102) may have a double-balanced mixer structure in order to suppress both the local-oscillation-signal element and the image element at the mixer output, without relying on the bandpass filter (103).

Figure 3B:
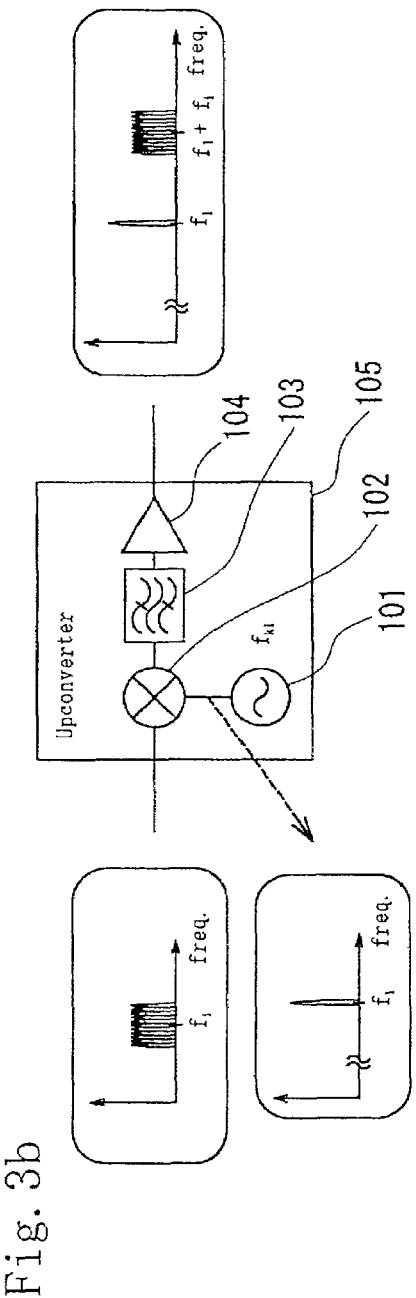

In the converter of the structure shown in FIG. 3b, the input signal and the signal from the local oscillator (101) enter the mixer (102). The bandpass filter (108) removes only the image element, and the local-oscillation-signal element is remaining with the upconverted signal for output. Otherwise, the mixer (102) may have the double-balanced structure in order to suppress both the local oscillation signal element and the image element at the mixer output not relying on the bandpass filter (103).

Figure 3C:
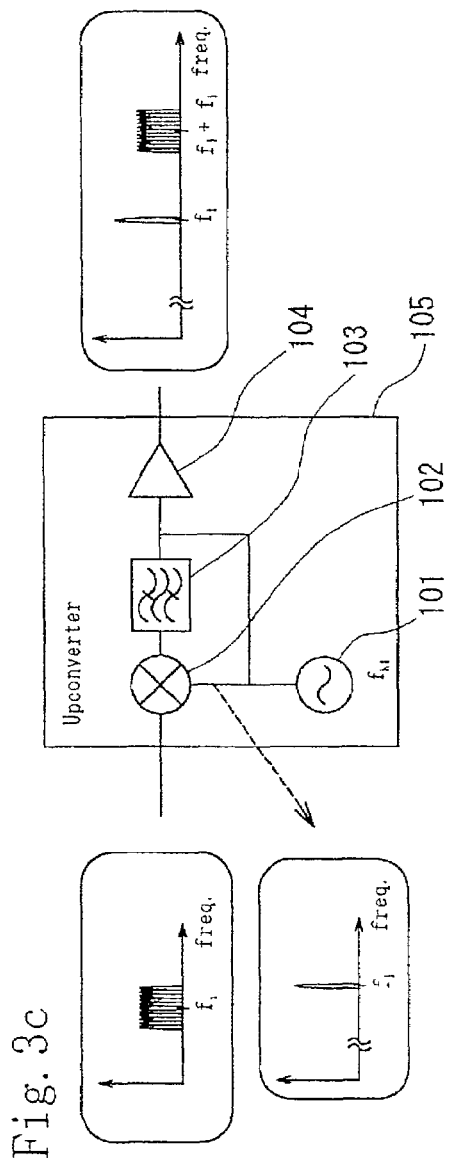

In the converter of the structure shown in FIG. 3c, the local-oscillation-signal element and the image element are suppressed in the same manner as in FIG. 3a. This converter is an upconverter that will add a signal that has been branched in advance from the output of the local oscillator (101).

Figure 3D:
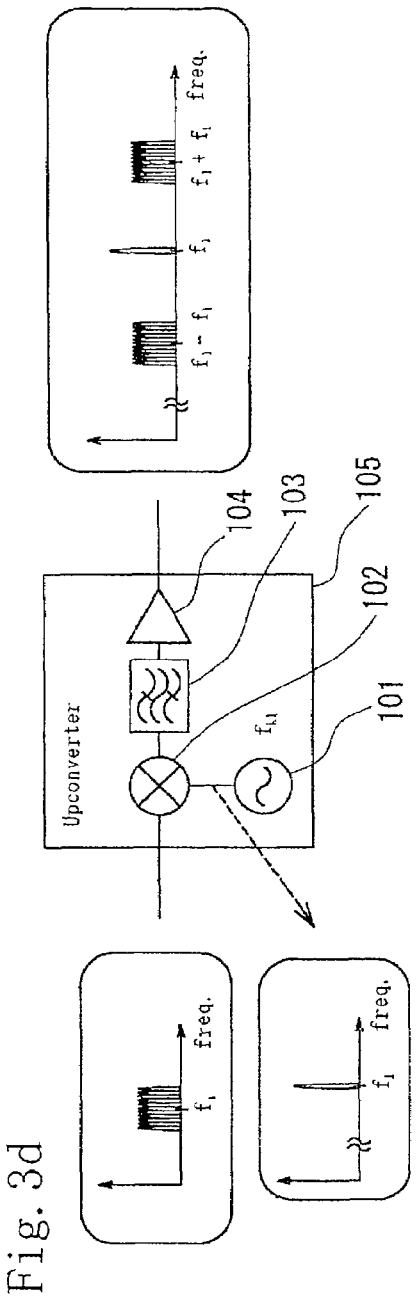

FIG. 3d is an example of a double-side-band-type upconverter that does not suppress either the image element or the local-oscillation-signal element.

In FIG. 3e, the mixer (102) has a balanced mixer structure; otherwise, the local-oscillation-signal element is suppressed by the bandpass filter (103) at least once. This is a double-side-band-type upconverter that will add a signal branched in advance from the output of the local oscillator (101).

In FIG. 1, the transmitter (1) comprises at least one upconverter of (11) (12) . . . (13) and a transmission antenna (14). If it has only one upconverter, the upconverter adopts one of the structures shown in FIGS. 3b–3e.

If it has two or more upconverters, one of them has one of the structures shown in FIGS. 3b–3e, and the others have the structure shown in FIG. 3a.

Meanwhile, in principle, the self-heterodyne-type receiver (2) converts (downconverts) the signal frequency to a desired intermediate frequency band (26) by generating the multiplicative elements of the RF-band modulated signals (25a), (25c) received by the antenna (24), and the non-modulated carrier (25b) multiplexed therein. The major constituting members of the receiver (2) are the reception antenna (24) and downconverters (21) (22) . . . (23), and the downconverters have one of the structures shown in FIGS. 4a–4c.

Figure 4A:
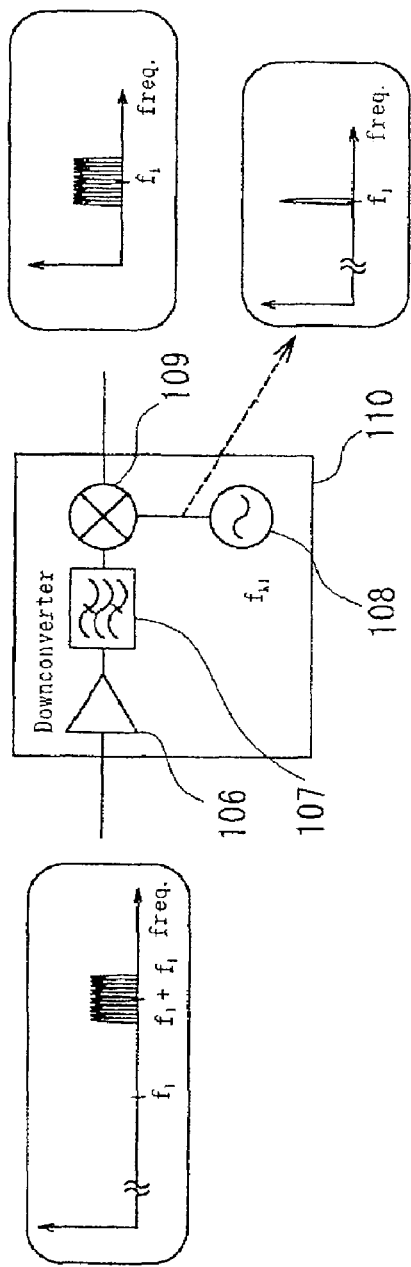
FIGS. 4a through 4c are examples of the downconverter of the transmitter.

In the converter of the structure shown in FIG. 4a, the amplifier (106) amplifies the input signal, and the bandpass filter (107) removes unnecessary signal elements. Downconverting is then achieved by transmitting the filtered signal and the signal from the local oscillator (108) to the mixer (109).

Figure 4B:
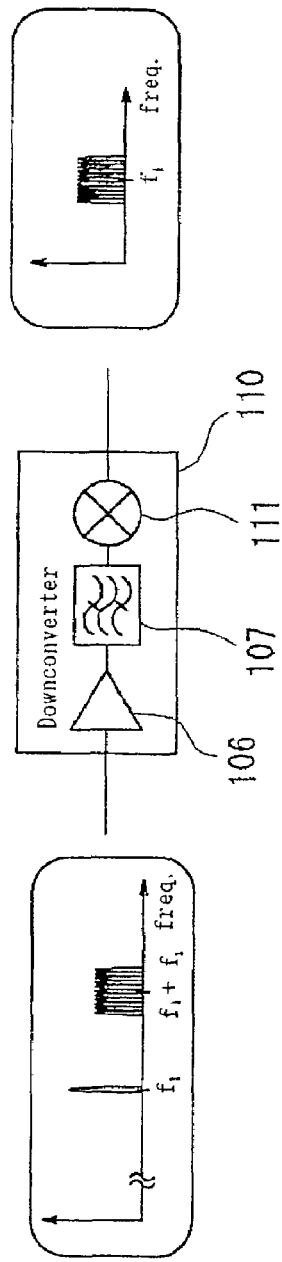

In the converter of the structure shown in FIG. 4b, the amplifier (106) amplifies the input signal and the bandpass filter (107) removes unnecessary signal elements, and a square-law-detector (111) completes the downconverting.

Figure 4C:
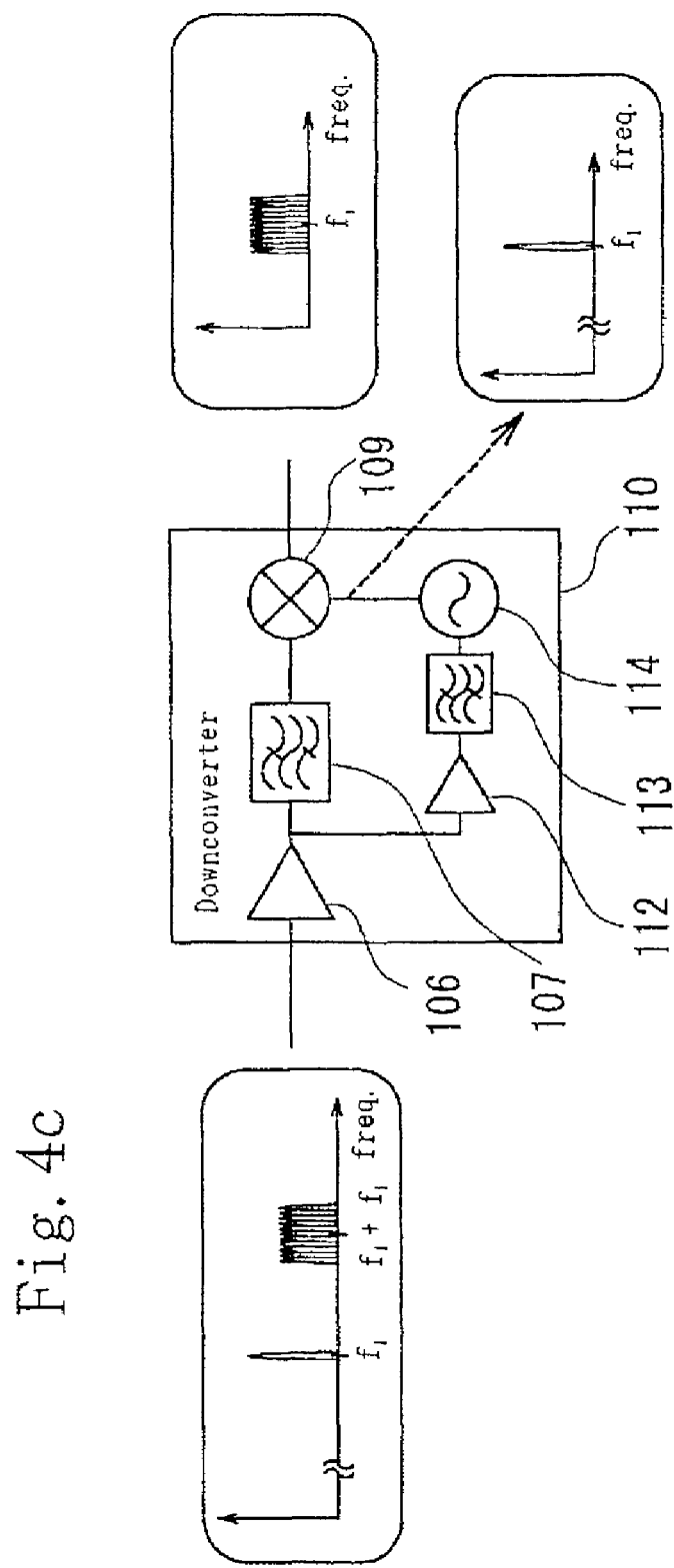

In the converter of the structure shown in FIG. 4c, the amplifier (106) amplifies the input signal, and part of the amplified signal is branched off. The branched signal is further processed by an amplifier (112), a bandpass filter (113), and an injection locking oscillator or a single-mode synchronized amplifier (114) to restore only the non-modulated signal element. The restored signals are transmitted to the mixer (109) in order to complete downconverting.

In FIG. 2, the receiver (2) has a reception antenna (24) and at least one downconverter (21) (22) . . . (23). If the receiver has only one downconverter, the downconverter has either of the structures shown in FIGS. 4b, 4c.

If two or more downconverters are used, one of them has either of the structures shown in FIGS. 4b, 4c, and the others have the structure shown in FIG. 4a.

The present invention employing the above-described self-heterodyne-type wireless communications system improves the performance of communications using high-frequency bands that are expected to be a future frequency source, such as the millimeter-wave band.

Specifically, the invention provides a wireless communications system for realizing combining diversity, primarily using the above wireless transmitter (2) and the wireless receiver (3).

Figure 5:
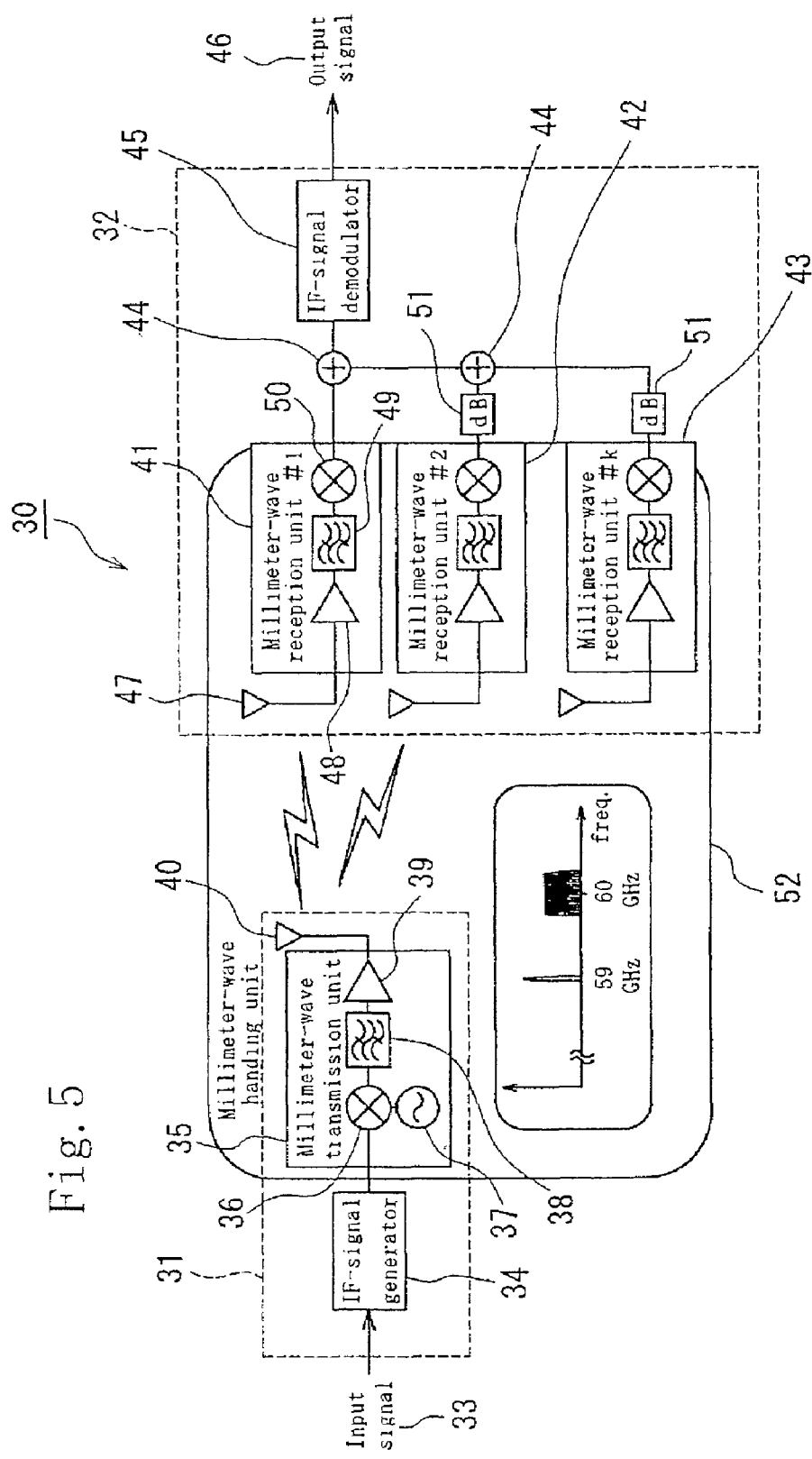
FIG. 5 is a diagram illustrating the reception diversity according to the present invention.
Figure 6:
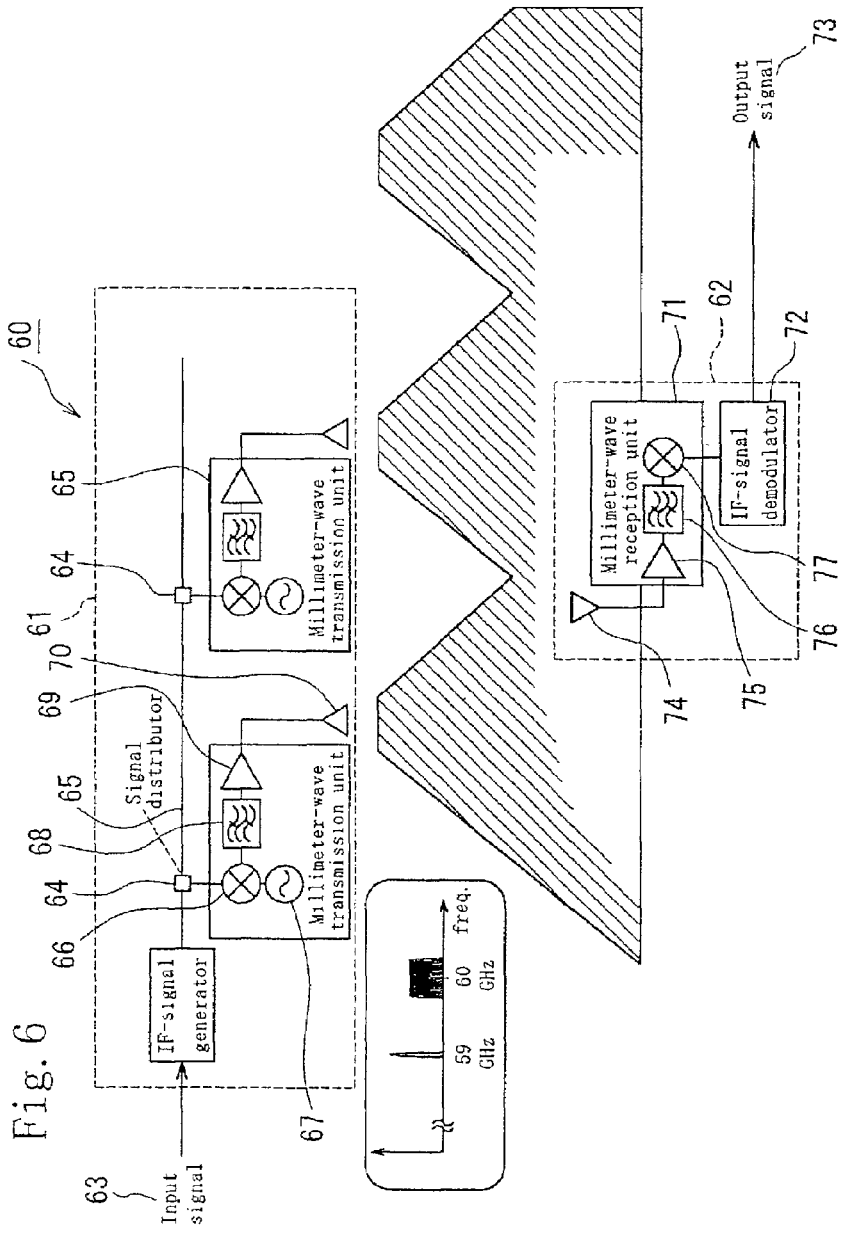
FIG. 6 is a diagram illustrating the transmission diversity according to the present invention.

FIG. 5 shows a wireless communications system employing diversity for signal reception, while FIG. 6 shows a wireless communications system employing diversity for signal transmission. They are described individually below.

The wireless communications system (30) shown in FIG. 5 comprises a wireless transmitter (31) and a wireless receiver (32). This system modulates the input signal (33) in an IF-signal generator (34) to produce IF-band modulated signals.

The IF-band modulated signals are sent to a millimeter-wave transmission unit (35), and are then sent out wirelessly at a millimeter-wave frequency, such as 60 GHz. The millimeter-wave transmission unit (35) is equipped with a mixer (36), a local oscillator (37), a bandpass filter (38), an amplifier (39) and a transmission antenna (40). The mixer (36) provides signals in which the non-modulated carrier is multiplexed with the radio-frequency modulated signal and it is not rejected in the following band-pass-filter (38), which is one of the features of the self-heterodyne-type system.

Meanwhile, the wireless receiver (32) has a plurality of millimeter-wave reception units (41) (42) (43); and the restored IF band signals are combined in adders (44) and demodulated in an IF demodulator (45) to be converted to an output signal (46).

Each of the millimeter-wave reception units (41) (42) (43) has a reception antenna (47), an amplifier (48), a bandpass filter (49), and a multiplexer (50).

There may be non-time-variant offset in phase and power in the IF-band modulated signals received by a plurality of millimeter-wave reception units (41) (42) (43). The IF-band modulated signal obtained in one of the reception units, such as the unit (41), can then be used to provide appropriate phase-offset and power adjustment to the IF-band modulated signals received in the other millimeter-wave reception units (42) (43). Thus, the present invention installs signal adjustors (51) and combines the adjusted signals using adders (44).

According to the above configuration, the non-modulated carrier generated in one local oscillator (37) of the millimeter-wave transmission unit is used to provide the IF-band modulated signals to the individual millimeter-wave reception units. Thus, the converter system is not affected by frequency offset or phase noise generated when a plurality of independent local oscillators are installed in the respective millimeter-wave reception units.

The IF signals sent from an originating site can then be restored and synthesized in a completely coherent manner, and a diversity effect can be attained by a handy, low-cost system.

Because combining diversity can be realized, if either party's signal path is blocked by an obstacle in a millimeter-wave link, there is no instantaneous interruption in communication signals, and seamless diversity can be realized.

Next, the wireless communications system (60) shown in FIG. 6, which realizes diversity in transmission, will be described. This system (60) comprises a wireless transmitter (61) and a wireless receiver (62). The input signal (63) is modulated in an IF-signal generator (78) to provide IF-band modulated signals.

The IF-modulated signals are distributed to a plurality of millimeter-wave transmission units (65) by signal distributors (64).

The millimeter-wave transmission units (65) send signals wirelessly at a millimeter-wave frequency, such as 60 GHz. The millimeter-wave transmission unit (65) has a mixer (66), a local oscillator (67), a bandpass filter (68), an amplifier (69), and a transmission antenna (70). The mixer (66) mixes the IF-band modulated signal with the local oscillation signal and both of the obtained radio-frequency-band modulated signals and the local oscillation signal are transmitted from the antenna (70), which is one of the features of the self-heterodyne system.

Meanwhile, the wireless receiver (62) receives signals in a millimeter-wave reception unit (71), down-converts the signals in an RF-band signals into those of an IF band, and provides an output signal (73) by demodulating the IF band signal using IF demodulator (72).

The millimeter-wave reception unit (71) is equipped with a reception antenna (74), an amplifier (75), a bandpass filter (76), and a mixer (77).

The above configuration of the self-heterodyne type is not affected by the frequency offset or phase noise generated when a plurality of independent oscillators are installed in the transmitter or receiver. Furthermore, IF signals can be distributed and synthesized in a completely coherent manner in the wireless receiver.

Although the millimeter-wave transmission unit (35) in FIG. 5 adopts the configuration shown in FIG. 3b, it can be configured differently, as desired. In addition, the configuration of the millimeter-wave reception units (41) (42) (43) is not limited to that shown in FIG. 4b.

If the self-heterodyne mechanism is adopted, the transmitter and converter of the present invention can take a variety of configurations. The inner structures of the individual transmission and reception units (35) (41) (42) (43) in the millimeter-wave handling system (52) shown in FIG. 5 are not fixed, and indeed may take any of the configurations disclosed in Japanese Patent Kokai publication No. 2001-53640.

The self-heterodyne-type wireless communications system set forth in claim 1 can reduce the cost of the wireless system and simplify the system structure, as well as provide reception diversity suitable for such a system.

Due to the diversity of signal reception, stable wireless communication with no instantaneous interruption is ensured in the millimeter-wave link, even if either party's receiving path is blocked by an obstacle. Compared with conventional methods of providing diversity, the present configuration of the invention can simplify the hardware structure and reduce the overall system cost.

The self-heterodyne-type wireless communications system set forth in claim 2 is not affected by the frequency offset or phase noise generated when a plurality of independent oscillators are installed in the transmitter or receiver. Furthermore, IF signals can be distributed and synthesized in a completely coherent manner in the converter.

In addition, even when the wireless receiver has moved, the transmission antenna can perform seamless handoff, as there is no sudden frequency offset. In this way, low-cost transmission diversity is realized with a simple hardware structure.

The self-heterodyne-type wireless communications systems set forth in claims 3 and 4 can reduce the system cost, realizing a wireless transmitter or converter that provides diversity during communication.

What is claimed is:

1. A self-heterodyne-type wireless diversity communications system, comprising
    a wireless millimeter-wave band transmitter for mobile communications in a multicell, the wireless millimeter-wave band transmitter modulating intermediate-frequency signals to modulated radio-frequency signals applying a local oscillation signal, and wirelessly transmitting the local oscillation signal and the modulated radio-frequency signals added on the local oscillation signal; and
    a wireless millimeter-wave band receiver for the mobile communications in the multicell, the wireless millimeter-wave band receiver demodulating the modulated radio-frequency signals added with the local oscillation signal into demodulated intermediate-frequency signals applying a multiplicative element produced by multiplying the local oscillation signal and the modulated radio-frequency signals,
    the wireless millimeter-wave band transmitter further including:
        an intermediate-frequency-band modulator that modulates signals to be transmitted into the intermediate-frequency signals;
        a plurality of signal distributors that distribute the intermediate-frequency signals;
        a plurality of signal-transmission units that modulates the distributed intermediate-frequency signals into the modulated radio-frequency signals; and
        a plurality of mixers that add the distributed intermediate-frequency signals and the local oscillation signal.

2. The self-heterodyne-type wireless diversity communications system of claim 1, wherein each of the signal-transmission units includes:
    local oscillating means for oscillating the local oscillation signal,
    multiplexing means for producing the multiplicative element,
    bandpass filtering means,
    amplifying means, and
    a transmission antenna.

3. A self-heterodyne-type wireless diversity communications system, comprising:
    a wireless millimeter-wave band transmitter for mobile communications in a multicell, the wireless millimeter-wave band transmitter modulating signals of an intermediate-frequency band to those of a radio-frequency band applying a local oscillation signal, and wirelessly transmits the local oscillation signal and the modulated radio-frequency signals added on the local oscillation signal; and
    a wireless millimeter-wave band receiver for the mobile communications in the multicell, the wireless millimeter-wave band receiver demodulating the received modulated radio-frequency signals into intermediate-frequency signals applying a multiplicative element produced by multiplying the received local oscillation signal and the received modulated radio-frequency signals,
    the millimeter-wave band wireless receiver further including:
        a plurality of signal-reception units that receive the modulated radio-frequency signals added to the local oscillation signal via respective reception antennas;
        a plurality of signal adjustors that either offset phase or control power of the received modulated intermediate-frequency signals;
        signal synthesizers that synthesize the received modulated intermediate-frequency signals from the plurality of signal adjustors; and
        an intermediate-frequency demodulator that demodulates the synthesized modulated intermediate-frequency signals.

4. The self-heterodyne-type wireless diversity communications system of claim 3, wherein each of the signal-reception units includes:
    a reception antenna,
    amplifying means,
    bandpass filtering means, and
    multiplexing means for producing the multiplicative element.

* * * * *